(12) United States Patent
Dawson et al.

(10) Patent No.: US 12,459,557 B2
(45) Date of Patent: Nov. 4, 2025

(54) APPARATUS FOR USE IN TURNING STEERABLE VEHICLE WHEELS

(71) Applicant: ZF Active Safety and Electronics US LLC, Livonia, MI (US)

(72) Inventors: Michael Dawson, Washington, MI (US); Ramesh Chirla, Washington, MI (US); Himadri Kumar Shastry, Washington, MI (US); Olivier Pugliese, Lebanon, IN (US); Ryan Noerenberg, Washington, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 484 days.

(21) Appl. No.: 18/075,471

(22) Filed: Dec. 6, 2022

(65) Prior Publication Data

US 2024/0182106 A1   Jun. 6, 2024

(51) Int. Cl.
*B62D 5/04* (2006.01)

(52) U.S. Cl.
CPC ......... *B62D 5/0448* (2013.01); *B62D 5/0424* (2013.01); *B62D 5/046* (2013.01); *B62D 5/0487* (2013.01)

(58) Field of Classification Search
CPC .... B62D 5/0448; B62D 5/0424; B62D 5/046; B62D 5/0487
See application file for complete search history.

(56) References Cited

U.S. PATENT DOCUMENTS

| 7,909,132 B2 | 3/2011 | Szabela et al. |
| 2006/0278466 A1* | 12/2006 | Cheng ............... B62D 5/046 180/444 |
| 2019/0329816 A1* | 10/2019 | Ko .................. B62D 5/0424 |
| 2023/0399046 A1* | 12/2023 | Dawson ............. B62D 5/0448 |

FOREIGN PATENT DOCUMENTS

| JP | 2004074831 A | * | 3/2004 | ............. B62D 5/04 |
| JP | 2011183941 A | * | 9/2011 | |
| WO | WO-2020095705 A1 | * | 5/2020 | ............. B62D 5/04 |

* cited by examiner

*Primary Examiner* — Jacob D Knutson
(74) *Attorney, Agent, or Firm* — Tarolli, Sundheim, Covell & Tummino LLP

(57) ABSTRACT

An apparatus for use in turning steerable vehicle wheels includes a steering member which is axially movable relative to the vehicle to effect turning movement of the steerable vehicle wheels. A ball nut assembly is connected with an externally threaded portion of the steering member. A first motor connected with the ball nut assembly by a belt is operable to effect rotation of the ball nut assembly relative to the steering member. A second motor connected with the ball nut assembly and the first motor by the belt is operable to effect rotation of the ball nut assembly relative to the steering member.

10 Claims, 2 Drawing Sheets

APPARATUS FOR USE IN TURNING STEERABLE VEHICLE WHEELS

TECHNICAL FIELD

The present invention relates to an apparatus for use in turning steerable vehicle wheels.

BACKGROUND

A known vehicle steering apparatus includes a steering member which is axially movable to effect turning movement of steerable vehicle wheels. A ball nut assembly is connected with an externally threaded portion of the steering member. A motor is connected with the ball nut assembly. The motor is operable to effect rotation of the ball nut assembly relative to the steering member.

SUMMARY

The present invention relates to an apparatus for use in turning steerable vehicle wheels. The apparatus includes a steering member which is axially movable relative to the vehicle to effect turning movement of the steerable vehicle wheels. A ball nut assembly is connected with an externally threaded portion of the steering member. The steering member moving axially in response to rotation of the ball nut assembly relative to the steering member. A first motor connected with the ball nut assembly by a belt is operable to effect rotation of the ball nut assembly relative to the steering member. A second motor connected with the ball nut assembly and the first motor by the belt is operable to effect rotation of the ball nut assembly relative to the steering member.

In accordance with another of the features of the present invention, a first drive pulley is rotatable about a first axis by the first motor and a second drive pulley is rotatable about a second axis by the second motor. The first and second drive pulleys are connected together by the belt.

In accordance with another feature of the present invention, an idler pulley is connected with the first and second drive pulleys and the ball nut assembly by the belt.

In accordance with another feature of the present invention, an electronic control unit controls the first and second motors and at least one motor sensor detects whether at least one of the first and second motors is operating correctly. The ECU adjusts operation of one of the first and second motors if the other of the first and second motors is detected by the at least one motor sensor to not be operating correctly.

In accordance with another feature of the present invention, the first and second motors provide redundancy for each other.

In accordance with another feature of the present invention, the apparatus is a steer-by-wire apparatus.

BRIEF DESCRIPTION OF THE DRAWINGS

The foregoing and other features of the present invention will become more apparent to those skilled in the art to which the present invention relates upon reading the following description with reference to the accompanying drawings, in which.

DETAILED DESCRIPTION

Figure 1:
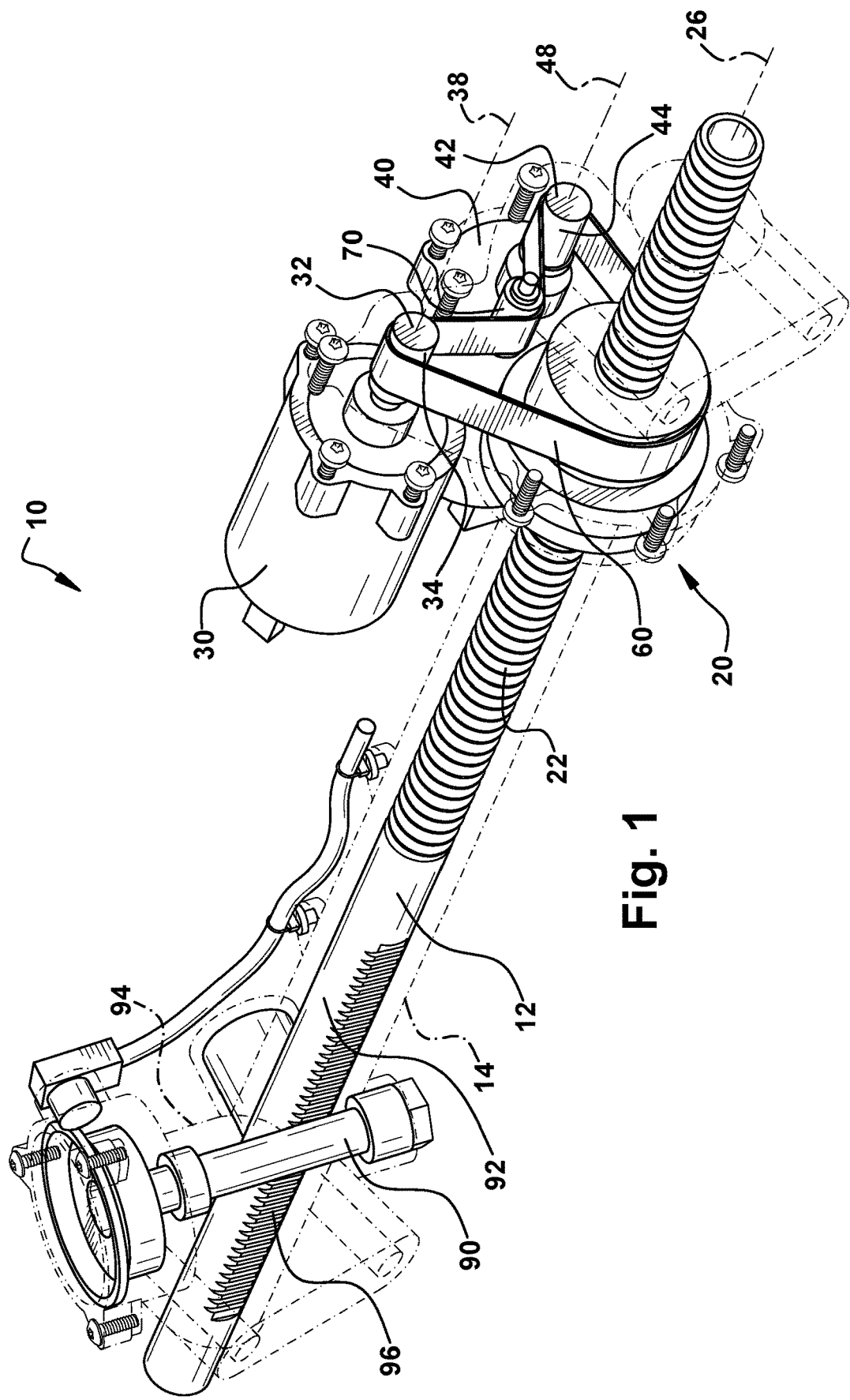
FIG. 1 is a schematic pictorial view of an example of an apparatus for use in turning steerable vehicle wheels constructed in accordance with the present invention.
Figure 2:
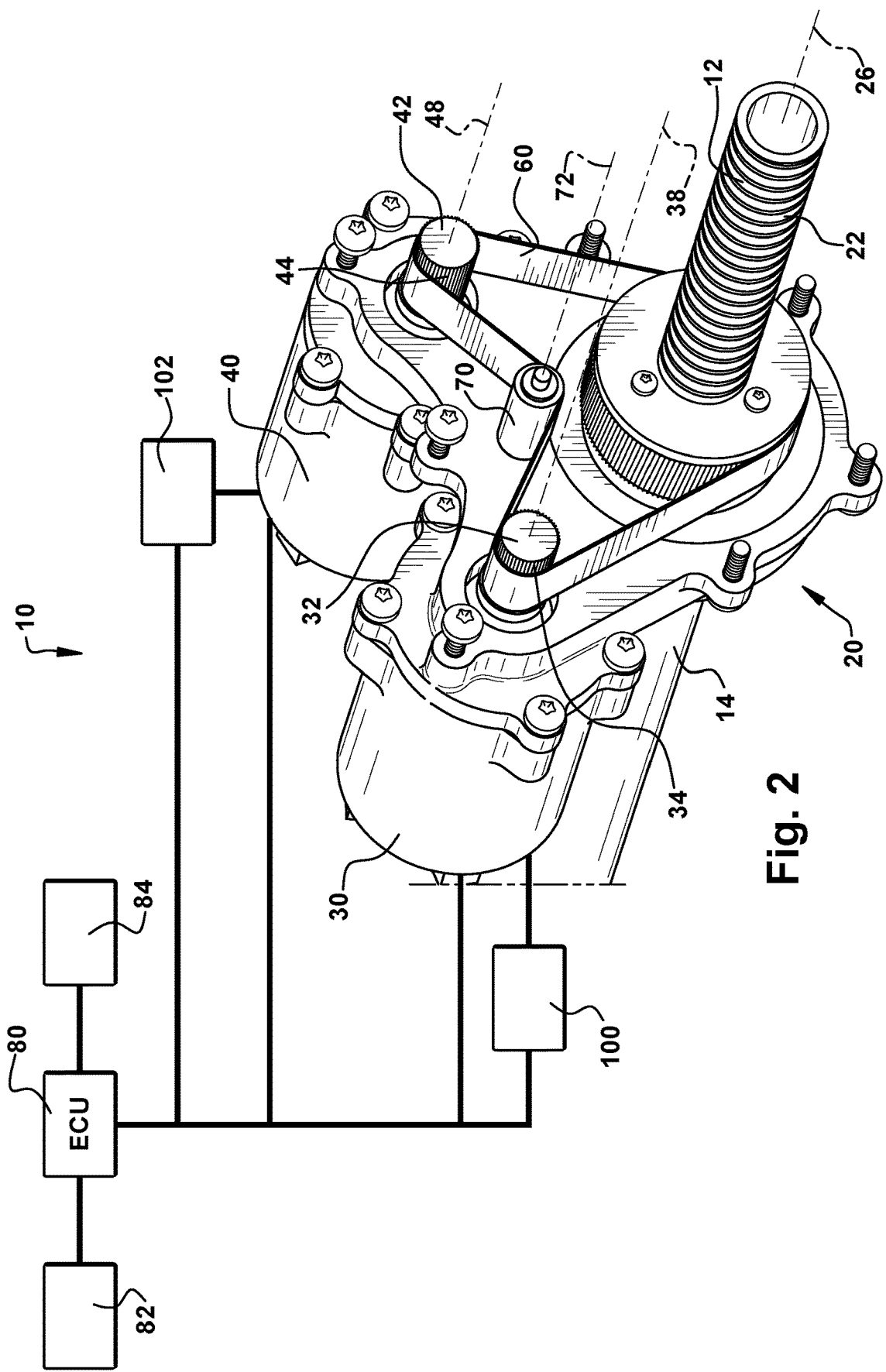
FIG. 2 is a schematic pictorial view of a portion of the apparatus of FIG. 1.

An example of an apparatus 10 for turning steerable vehicle wheels constructed in accordance with the present invention is illustrated in FIGS. 1-2. The apparatus 10 includes a steering member 12 which is connected to steerable vehicle wheels, as known in the art. A housing 14 supports the steering member 12 for axial or linear movement relative to the housing.

A ball nut assembly 20 extends around an externally threaded portion 22 of the steering member 12. The ball nut assembly 20 is supported in the housing 14 for rotation relative to the housing and the steering member 12 about a longitudinally extending central axis 26 of the of the steering member. Rotation of the ball nut assembly 20 relative to the steering member 12 is effective to move the steering member axially relative to the housing 14. The housing 14 encloses the ball nut assembly 20 along with at least a portion of the steering member 12.

A first reversible electric motor 30 is operable to rotate the ball nut assembly 20 relative to the steering member 12 and the housing 14. The first electric motor 30 has an output shaft 32 connected to a first drive pulley 34. The first drive pulley 34 and the output shaft 32 are supported in the housing 14 for rotation about a longitudinal axis 38 extending generally parallel to the axis 26 of the steering member 12.

A second reversible electric motor 40 is operable to rotate the ball nut assembly 20 relative to the steering member 12 and the housing 14. The second electric motor 40 has an output shaft 42 connected to a second drive pulley 44. The second drive pulley 44 and the output shaft 42 are supported in the housing 14 for rotation about a longitudinal axis 48 extending generally parallel to the axis 26 of the steering member 12 and the axis 38 of the first drive pulley 34.

The first and second drive pulleys 34, 44 are connected with the ball nut assembly 20 by a drive belt 60. The drive belt 60 transmits force to the ball nut assembly 20 to rotate the ball nut assembly about the axis 26 of the steering member 12 during operation of at least one of the motors 30, 40. The drive belt 60 engages an idler pulley 70 located generally between the drive pulleys 34, 44. The idler pulley 70 is supported by the housing 14 for rotation about an axis 72 extending generally parallel to the axes 38, 48 of the drive pulleys 34, 44. The idler pulley 70 helps tension and guide the drive belt 60.

The apparatus 10 (FIG. 2) may be a steer-by-wire apparatus that has no mechanical connection to a steering input member, such as a steering wheel. An electronic control unit (ECU) 80 may control the first and second motors 30, 40. The ECU 80 effects operation of the first and second motors 30, 40 to axially move the steering member 12 relative to the housing 14 to steer the vehicle wheels. The ECU 80 may receive an input signal indicative of a desired path of travel for the vehicle. The ECU 80 may analyze the desired path of travel and operate the first and second motors 30, 40 to axially move the steering member 12 relative to the housing 14 to turn the vehicle wheels a predetermined amount and cause the vehicle to travel along the desired path. The ECU 80 may operate the first motor 30, the second motor 40 or both motors depending on the force necessary to move the steering member 12 the predetermined amount relative to the housing 14.

The apparatus 10 may include vehicle condition sensors 82, 84 for controlling the first and second motors 30, 40 based on sensed vehicle conditions. The vehicle condition sensors 82, 84 may include a torque sensor 82 and a position sensor 84 electrically connected to the ECU 80. The torque sensor 82 may sense torque applied to a steering wheel and generate a signal indicative of the torque. The position sensor 84 may sense the rotational position of the steering wheel and generate an electrical signal indicative of the steering wheel position. The electrical signals from the torque sensor 82 and the position sensor 84 are sent to the ECU 80. The ECU 80 analyzes the output of the sensors 82, 84 and effects operation of the first and second motors 30, 40 as a function of the output of the sensors.

In addition, the ECU 80 may have inputs which vary as a function of sensed lateral acceleration of the vehicle or other vehicle operating conditions. The ECU 80 receives the signals generated by the sensors and actuates the first and second motors 30, 40 in order to apply an axial force to the steering member 12 to turn the steerable vehicle wheels.

A pinion 90 (FIG. 1) may be in meshing engagement with a rack portion 92 of the steering member 12 such that axial or linear movement of the steering member causes rotation of the pinion relative to a pinion housing portion 94 of the housing 14. In particular, the rack portion 92 includes rack gear teeth 96 disposed in meshing engagement with gear teeth on the pinion 90, as known in the art. The pinon 90 may help prevent rotation of the steering member 12 relative to the housing 14 about the axis 26 of the steering member.

Sensors may be connected to the pinion housing portion 94 to detect rotational movement of the pinion 90 about the pinion axis. The sensors connected to the pinion housing portion 94 may be electrically connected to the ECU 80. The electrical signals from the sensors connected to the pinion housing portion 94 are sent to the ECU 80. The ECU 80 analyzes the output of the sensors to determine if the steering member 12 has axially moved the predetermined amount.

The apparatus 10 (FIG. 2) may also include motor sensors 100, 102 that detect whether the first and second motors 30, 40 are operating correctly. The motor sensors 100, 102 may be electrically connected to the ECU 80. The ECU 80 may analyze the output of the motor sensors 100, 102 to determine if the first and second motors 30, 40 are operating correctly. If the ECU 80 determines that one of the first and second motors 30, 40 is not operating correctly, the ECU 80 may adjust the operation of the other motor to compensate for the motor not operating correctly. Therefore, the first and second motors 30, 40 may provide redundancy for each other.

Although the example of the present invention is shown as a steer-by-wire apparatus, it is contemplated that the pinion 90 may be connected to a steering column that includes a rotatable steering wheel. Upon rotation of the steering wheel, force is transmitted through the steering column to the pinion 90. The pinion 90 thereby rotates under the influence of force transmitted through the steering column. Due to the meshed engagement between the pinion 90 and the rack portion 92, rotation of the steering wheel and, thus, rotation of the pinion results in linear movement of the rack portion of the steering member 12. Accordingly, rotation of the steering wheel results in turning of the steerable vehicle wheels. The first and second motors 30, 40 may apply a force to the steering member 12 through the ball nut assembly 20 to assist in turning of the steerable vehicle wheels.

As can been seen from the above description, the apparatus of the present invention may be used to autonomously steer the vehicle wheels, may be used in a steer-by-wire system or used as a power assist steering system.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An apparatus for use in turning steerable vehicle wheels, the apparatus comprising:
a steering member which is axially movable relative to the vehicle to effect turning movement of the steerable vehicle wheels;
a ball nut assembly connected with an externally threaded portion of the steering member, the steering member moving axially in response to rotation of the ball nut assembly relative to the steering member;
a first motor connected with the ball nut assembly by a belt, the first motor being operable to effect rotation of the ball nut assembly relative to the steering member;
a second motor connected with the ball nut assembly and the first motor by the belt, the second motor being operable to effect rotation of the ball nut assembly relative to the steering member; and
a first drive pulley rotatable about a first axis by the first motor and a second drive pulley rotatable about a second axis by the second motor, the first and second drive pulleys being connected together by the belt.

2. An apparatus as set forth in claim 1 further including an idler pulley connected with the first and second drive pulleys and the ball nut assembly by the belt.

3. An apparatus as set forth in claim 1 further including an electronic control unit (ECU) that controls the first and second motors and at least one motor sensor connected with the ECU that detects whether at least one of the first and second motors is operating correctly, the ECU adjusting operation of one of the first and second motors if the other of the first and second motors is not operating correctly.

4. An apparatus as set forth in claim 1 wherein the first and second motors provide redundancy for each other.

5. An apparatus as set forth in claim 1 wherein the apparatus is a steer-by-wire apparatus.

6. An apparatus as set forth in claim 1 wherein the first axis extends parallel to the second axis.

7. An apparatus as set forth in claim 6 wherein the first axis and the second axis extend parallel to an axis of the steering member.

8. An apparatus as set forth in claim 7 further including an idler pulley connected with the first and second drive pulleys and the ball nut assembly by the belt, the idler pulley being rotatable about a third axis extending parallel to the first axis, the second axis and the axis of the steering member.

9. An apparatus as set forth in claim 8 wherein the third axis of the idler pulley is located closer to the axis of the steering member than the first and second axes.

10. An apparatus as set forth in claim 1 wherein the first axis is spaced from the second axis.

* * * * *